United States Patent [19]

Whelan, Jr.

[11] Patent Number: 4,478,542

[45] Date of Patent: Oct. 23, 1984

[54] EXPANSION ANCHOR GRIP SLEEVE ASSEMBLY

[76] Inventor: Russell Whelan, Jr., 5638 Miriam Rd., Philadelphia, Pa. 19124

[21] Appl. No.: 470,799

[22] Filed: Feb. 28, 1983

[51] Int. Cl.$^3$ .............................................. F16B 13/06
[52] U.S. Cl. ......................................... 411/26; 411/60
[58] Field of Search ....................... 411/24, 25, 26, 27, 411/28, 57, 60, 63, 64, 65, 47, 67

[56] References Cited

U.S. PATENT DOCUMENTS

| | | | |
|---|---|---|---|
| 927,064 | 7/1909 | Mower | 411/57 |
| 1,305,001 | 5/1919 | Ogden | 411/46 |
| 2,143,086 | 1/1939 | Pleister | 411/28 |
| 3,911,782 | 10/1975 | Liebig | 411/24 |

FOREIGN PATENT DOCUMENTS

| | | | |
|---|---|---|---|
| 2654 | 7/1979 | European Pat. Off. | 411/55 |
| 2237917 | 2/1974 | Fed. Rep. of Germany | 411/24 |
| 990103 | 5/1951 | France | 411/34 |
| 1328744 | 4/1963 | France | 411/24 |

Primary Examiner—Thomas J. Holko
Assistant Examiner—Adrian H. Whitcomb, Jr.
Attorney, Agent, or Firm—Caesar, Rivise, Bernstein & Cohen, Ltd.

[57] ABSTRACT

An expansion anchor grip sleeve assembly comprising an anchor grip sleeve axially aligned with an expansion anchor shield. The anchor grip sleeve possesses grasping prongs or locking means which engage the expansion anchor shield. A bolt passes through the anchor grip sleeve and expansion anchor shield with the bolt having threads that engage threads in the expanding plug in the expansion anchor shield, such that when the bolt is tightened the grasping prongs or locking means of the anchor grip sleeve engage the expansion anchor shield to activate the expansion anchor shield. This results in the establishment of the expansion anchor grip sleeve assembly in one or more surfaces.

5 Claims, 5 Drawing Figures

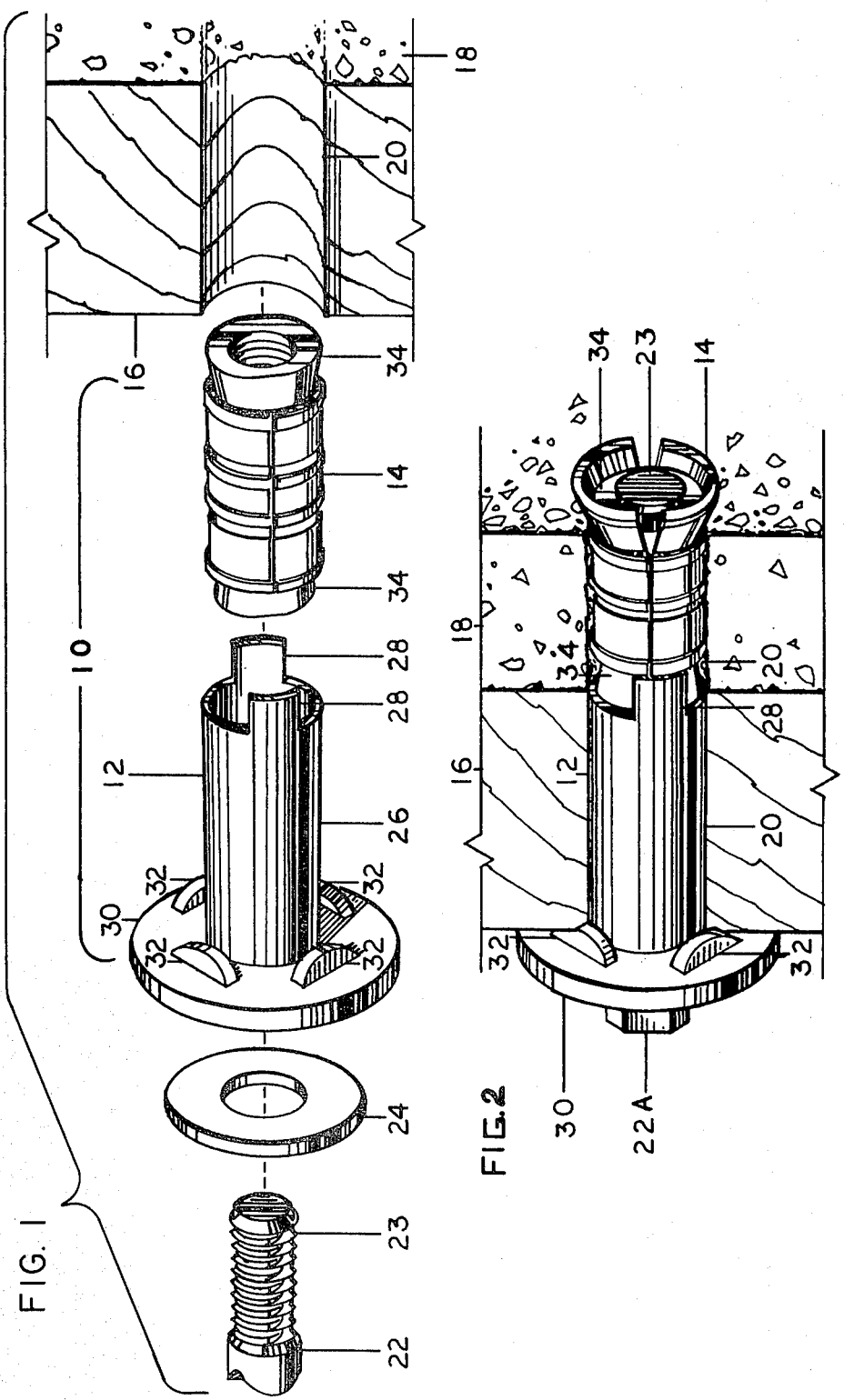

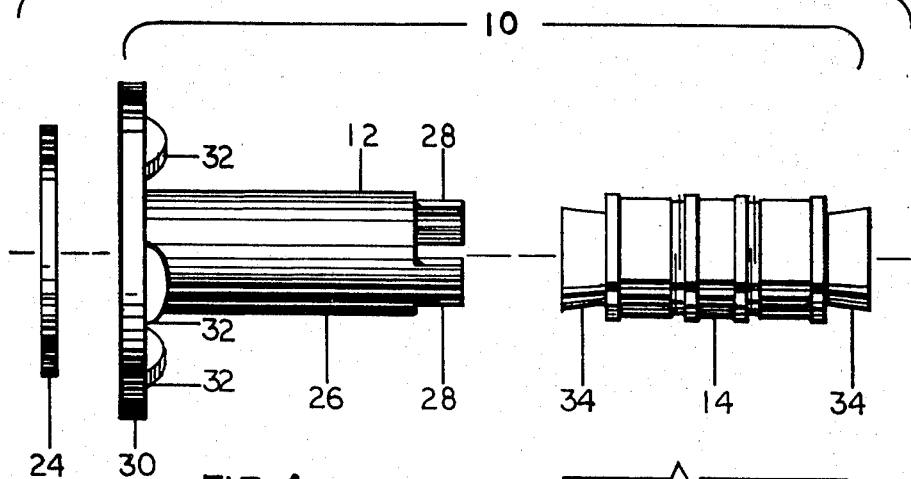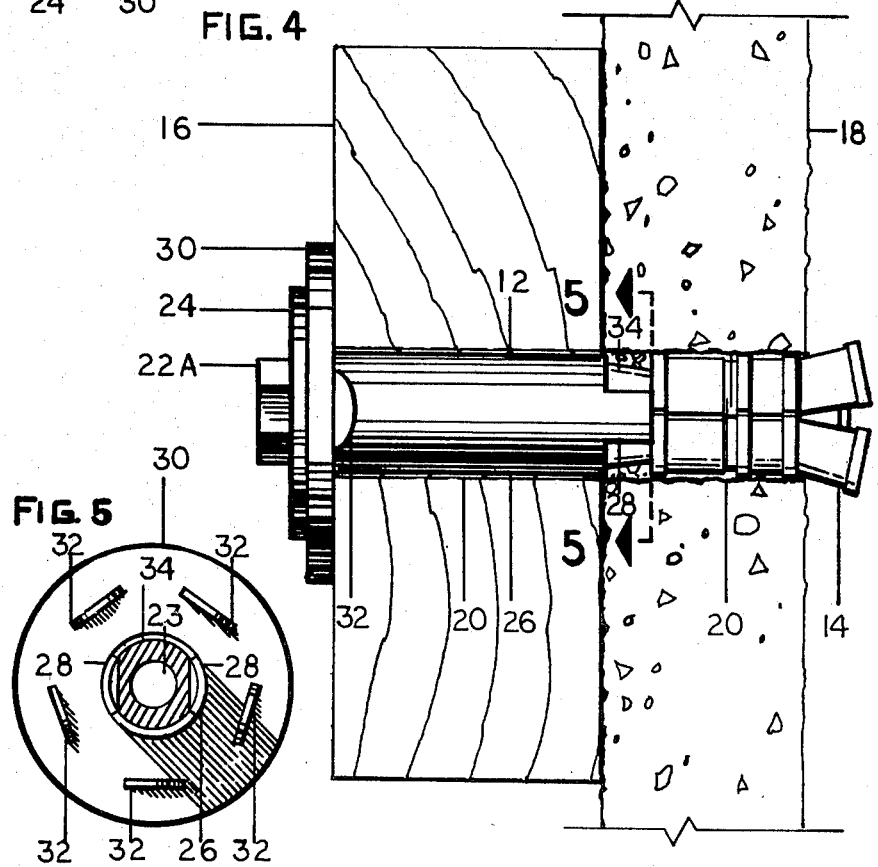

EXPANSION ANCHOR GRIP SLEEVE ASSEMBLY

BACKGROUND OF THE INVENTION

This invention relates to an expansion anchor grip sleeve assembly and more particularly to a new and improved device of this general class.

Expansion anchors are known for many uses which require that of a bolt or other fixing element be strongly held within a particular surface. Such expansion anchors are exemplified by U.S. Pat. Nos. 945,403, 1,302,588, 1,305,001, 3,911,782 and 3,964,229.

A frequent use of expansion anchors is to secure a panel, such as a wood panel to another surface, such as cinder block. When attaching relatively small panels or pieces of material of the order of one foot (25.4 cm) in either length or width, to another surface it is a relatively simple matter to use conventional expansion anchors. The usual procedure involves drilling two different hole sizes, one in the panel followed, by separate drilling of a different size hole in the cinder block surface in such a way that the panel holes are reasonably aligned with the cinder block holes. Then the panel with a pre-attached anchor and bolt is applied to the cinder block surface. In most cases the panel holes can be elongated enough in order to adjust for any misalignment. In a second method the expansion anchor is preinserted in the cinder block hole. Then the panel is held against the cinder block and the bolt is inserted through the panel hole and into the anchor.

However, when installing metal tracks, headers, studding, etc. or when dealing with panels of any size or shape or panels and other members of larger dimensions, such as four feet (1.22 m) by eight feet (2.44 m), or other uses that require the drilling of more than one hole, hole misalignment is the rule rather than the exception.

In view of the necessity for two different hole sizes, two separate and distinct hole drilling procedures are required for each and every expansion anchor, resulting in additional time and labor. Also, in the event one anchor is misaligned, or fails to hold or its otherwise improperly installed, it is sometimes necessary to remove previously installed panel or other member in order to correct this defective anchor.

Moreover, when attaching the larger panels it is usually necessary to have at least two mechanics working together. One mechanic aligns the panel holes with the cinder block holes while the other mechanic attempts to install the pre-attached anchor and bolt anchor in the aligned holes.

It is accordingly an object of the present invention to provide an expansion anchor grip sleeve assembly that dramatically reduces the time and labor of installations.

Another object of the present invention is to provide an expansion anchor grip sleeve assembly which can be preassembled and then installed in a single continuous and same size diameter hole, through both the material to be fastened and the material being fastened.

Yet another object of the present invention is to provide an expansion anchor grip sleeve assembly which does not require the prealignment of two different size holes in securing a large panel to another surface.

Still another object of the present invention is to provide an expansion anchor grip sleeve assembly that can be quickly and easily installed by a single hole drillng procedure.

Yet another object of the invention is to provide an expansion anchor grip sleeve assembly which can be readily installed by a single mechanic.

Another object of the present invention is to provide the installation of the same type of expansion anchor grip sleeve assembly for both solid and hollow core walls and other structural elements with equal and absolute holding power.

Yet another object of the present invention is to provide an expansion anchor grip sleeve assembly utilizing presently existing parts except for one specially designed part.

The foregoing as well as other objects of the invention are achieved by providing an expansion anchor grip sleeve assembly which comprises the usual expansion anchor shield, but which further includes an expansion anchor grip sleeve having external grasping prongs which function as locking means. The prongs serve to grasp the trailing end of the expansion anchor shield when a bolt passes through the anchor grip sleeve and is threadedly engaged within the expansion anchor shield. Thus, with further tightening of the bolt the anchor grip sleeve is drawn into firm engagement with the expansion anchor shield so that the prongs tightly engage the expansion anchor shield.

When using the expansion anchor grip sleeve assembly of the present invention it is simply necessary for a mechanic to drill one single hole in the panel at a desired location in such a manner that the drill bit passes into the second surface, such as a cinder block. Thus, the first hole in the panel is automatically and at the same time aligned with the first hole in the cinder block. An expansion anchor grip sleeve assembly of the present invention is then inserted in the two same size holes and installed in place. With the second and successive holes, it is necessary simply to drill one by one, the necessary number of single holes passing first through the panel and then into the cinder block. The expansion anchor grip assemblies are then inserted directly, from outside the panel, into the hole and activated by tightening the bolt.

Other objects and many of the attendant advantages of the invention will become more readily apparent by reference to the following figures of the drawing wherein:

FIG. 1 is an exploded three-dimensional view showing the various components of the expansion anchor grip sleeve assembly of the present invention;

FIG. 2 is a three-dimensional view similar to FIG. 1, but wherein the expansion anchor grip sleeve assembly has been installed;

FIG. 3 is another three-dimensional view, similar to FIG. 1, but wherein the components of the expansion anchor grip sleeve are seen at a generally 90° angle from the axis of the anchor;

FIG. 4 is a three-dimensional view, similar to FIG. 3, but wherein the anchor grip sleeve assembly has been installed to secure a wood panel to a cinder block surface with the wood panel and cinder block surface being seen in section; and FIG. 5 is a sectional view taken along the lines 5—5 of FIG. 4.

Referring now to greater detail to the various figures of the drawings wherein like reference characters refer to like parts there is generally shown in FIG. 1 an expansion anchor grip sleeve assembly at 10 embodying the present invention. The assembly 10 basically comprises anchor grip sleeve 12 and an axially aligned expansion anchor shield 14. In a preferred use in the invention a wood panel 16 is secured to cinder block 18 as indicated in FIGS. 1, 2 and 4.

The aforesaid securement occurs by the drilling of a hole 20 through the thickness of the wood panels 16 and into the cinder block 18. The depth of the hole 20 is not critical and need only be sufficient to receive the combined anchor grip sleeve 12 and expansion anchor shield 14 in the manner of FIGS. 2 and 4.

After the hole 20 has been drilled, the expansion anchor grip sleeve assembly 10 is inserted as a unit in the hole 20. It should be kept in mind that the expansion anchor grip sleeve assembly 10 is applied as a single unit which comprises bolt 22 (with bolt head 22A), washer 24, anchor grip sleeve 12 and expansion anchor shield 14.

The anchor grip sleeve 12 comprises a body member 26 from which project external grasping prongs or locking means 28. The anchor grip sleeve 12 further comprises a flange 30 from which fingers 32 project inwardly eventually to grasp a surface such as the wood panel 16 as shown in FIG. 2.

The internal surface of body member 26 is smooth and readily permits the passage of the partly threaded stem 23 and bolt 22. In fact, as seen in FIG. 5 the internal diameter of the body member 26 is somewhat larger than the diameter of the threaded bolt 22. Washer 24 is provided with an opening which also permits easy passage of the threaded bolt 22.

The expansion anchor shield 14 possesses a central opening 34 which is partially smooth and partially threaded. The unthreaded portion of the central opening (which has a somewhat larger diameter than threaded stem 23) permits easy passage of the threaded stem 23 of bolt 22. The bolt 22 is then received in a turning action in the forward by located female threads of the central opening 34 of the expansion anchor shield 14.

Thus, it is possible to provide a compact unit comprising the expansion anchor grip sleeve assembly of the present invention. The threaded bolt 22 simply passes through the washer 24, the body portion 26 of the anchor grip sleeve 12 and through the unthreaded portion of the expansion anchor shield 14. The threaded stem of the bolt 22 is then engaged in the female threads of the expansion anchor field 14 to provide a compact expansion anchor grip sleeve assembly.

After the hole 20 has been drilled, as shown in FIG. 1, the expansion anchor grip sleeve assembly unit is slipped into the hole. For this reason it is preferred that the hole have an inside diameter that is slightly larger than the outside diameter of anchor grip sleeve 12, it being understood that the hole in any panel or other surface, such as cinder block is drilled in a single step. Where cinder block is involved, the hole may be slightly wider in diameter because of the texture of the material. However, this does not necessitate any change in drill size.

Thus, with the insertion of the expansion anchor grip sleeve assembly, a hammer or other driving means may be used to tap the expansion anchor grip sleeve 12, into firm contact with the wood panel 16 so that the fingers 32 on the under side of flange 30 readily grasp the wood.

The bolt 22 is then turned with a wrench or similar device. The external grasping prongs or locking means 28 tightly grasp the expansion anchor shield and in conjunction with the projecting fingers 32 on flange 30, prevent its rotation inside the hole so that the tighting of the bolt can activate the expanding plug of the expansion anchor shield. This has the effect of both seating and at the same time locking the expansion anchor shield in the hole in the cinder block.

The assembly of the present invention can have relatively large or small dimensions. For instance, in one embodiment of the invention, the sleeve 12 has a length of 4.8 cm., with flange 30 having a diameter of 4.2 cm. The shield 14 has a length of 5.1 cm. The fingers 32 have a length of 0.2 cm. The external prongs 28 have a length of 0.6 cm. Also, the sleeve 12 can have a length as small as 2.54 cm.

Once the first expansion anchor grip sleeve assembly has been installed, it is a simple matter to drill a second hole at a desired place with the second hole passing through both the wood panel and the cinder block. The second expansion anchor grip sleeve assembly is located in the hole, tapped into place and then the bolt turned to actuate the expanding plug. This operation can be repeated by a single mechanic as long as it is deemed necessary to achieve proper securement of the wood panel to the cinder block wall.

Of course, the expansion anchor grip sleeve assembly of the present invention can be used to secure many different surfaces together, such as wood to wood or wood to plaster board or metal to wood or metal to cinder block. These are given by way of example only and not by way of limitation. In the preferred form, the expansion anchor shield is made from lead or other metal as is customary. The anchor grip sleeve is made from a somewhat less malleable metal, such as a steel alloy, with the bolt and the washer being made from conventional steel.

From the foregoing it can be seen that with the present invention there is the complete elimination of the need to drill two different size holes, when installing each expansion shield. Also, the entire expansion anchor grip sleeve assembly can be fully inserted and installed from outside of a panel or structural member or material that is to be fastened.

With the present invention there is provided a single and same type of expansion anchor grip sleeve assembly for use in installation of both solid and hollow core materials. Finally the expansion anchor grip sleeve assembly of the present invention provides the ability to preassemble and install one such assembly in a single continuous and same size hole, in one, two or more adjoining materials.

Without further elaboration, the foregoing will so fully illustrate my invention that others may, by applying current or future knowledge, readily adapt the same for use under various conditions of service.

I claim:

1. An expansion anchor grip sleeve assembly comprising an initially separable non-expandable grip sleeve in axial alignment with an initially separable expandable expansion anchor shield, said grip sleeve and anchor shield having aligned openings permitting the passage of a bolt, said bolt having a bolt head and a stem extending away from said bolt head, said bolt stem being positioned in said aligned openings, at least a portion of said stem being threaded to form a threaded stem which engages complimentary threads in the opening through said anchor shield, said grip sleeve having a flange having first and second faces with projecting fingers projecting away from said first face, said grip sleeve being positioned closer to said bolt head, and said anchor shield being positioned further away from said bolt head, said grip sleeve including locking means extending away from the first face of said flange in the same general direction of said fingers, with said bolt head being positioned against the second face of said flange, said locking means being adapted to be in actual contact with a portion of said expansion anchor, whereby when said assembly is located in a hole in a surface and said bolt is tightened by rotation thereof against said flange to urge said flange fingers against said surface such that said locking means actually contact a portion of said expansion anchor shield to prevent rotation of both said anchor sleeve and grip sleeeve in said hole, and whereby further rotation of the bolt is transferred solely to said expansion anchor shield to activate said expansion shield, thereby to firmly position said assembly in said hole.

2. The invention of claim 1 wherein said locking means are comprised of at least one prong extending from said grip sleeve to engage a surface of said expansion anchor shield when said bolt is tightened.

3. The invention of claim 2 wherein said locking means are comprised of two spaced prongs.

4. The invention of claim 1 wherein said anchor shield upon activation by rotation of said bolt engages at least a portion of the wall defining a hole to establish said assembly in said hole.

5. The invention of claim 4 wherein said assembly is partially located in said hole, but a portion of said expansion anchor shield projects beyond said hole.

* * * * *